US012600010B2

(12) United States Patent
Jung

(10) Patent No.: US 12,600,010 B2
(45) Date of Patent: Apr. 14, 2026

(54) APPARATUS FOR DESCALING INNER SURFACE OF BENDING STEEL PIPE

(71) Applicants: HYUNDAI MOTOR COMPANY, Seoul (KR); KIA CORPORATION, Seoul (KR)

(72) Inventor: Jaegyu Jung, Yongin-si (KR)

(73) Assignees: HYUNDIA MOTOR COMPANY, Seoul (KR); KIA CORPORATION, Seoul (KR)

( * ) Notice: Subject to any disclaimer, the term of this patent is extended or adjusted under 35 U.S.C. 154(b) by 469 days.

(21) Appl. No.: 17/680,831

(22) Filed: Feb. 25, 2022

(65) Prior Publication Data

US 2022/0402098 A1     Dec. 22, 2022

(30) Foreign Application Priority Data

Jun. 18, 2021     (KR) ........................ 10-2021-0079076

(51) Int. Cl.
| | |
|---|---|
| *B24C 1/08* | (2006.01) |
| *B08B 9/057* | (2006.01) |
| *B60N 2/68* | (2006.01) |

(52) U.S. Cl.
CPC ............. *B24C 1/086* (2013.01); *B08B 9/057* (2013.01); *B08B 2209/055* (2013.01); *B60N 2/68* (2013.01); *B60N 2205/00* (2013.01)

(58) Field of Classification Search
None
See application file for complete search history.

(56) References Cited

U.S. PATENT DOCUMENTS

| | | | | |
|---|---|---|---|---|
| 2,460,657 A | * | 2/1949 | Robinson | ................. C21D 7/06 |
| | | | | 451/36 |
| 5,506,286 A | * | 4/1996 | Kimura | ................ C08K 5/3435 |
| | | | | 524/103 |
| 6,286,823 B1 | * | 9/2001 | Morghen | ................. B23Q 3/18 |
| | | | | 269/305 |
| 2014/0235146 A1 | * | 8/2014 | Mingot | .................... B24B 7/02 |
| | | | | 451/392 |
| 2020/0094376 A1 | * | 3/2020 | Sayama | ................... B24C 1/08 |

\* cited by examiner

*Primary Examiner* — Brian D Keller
*Assistant Examiner* — Jason Khalil Hawkins
(74) *Attorney, Agent, or Firm* — MCDONNELL BOEHNEN HULBERT & BERGHOFF LLP

(57)     ABSTRACT

An apparatus for descaling an inner surface of a bending steel pipe includes a support pallet supporting a plurality of bending steel pipes of which first ends and second ends are opened, the plurality of bending steel pipes being disposed in one direction on the support pallet, a stopper part selectively stopping the first ends and the second ends of the plurality of bending steel pipes, a shot ball supply part supplying shot balls to inner portions of the plurality of bending steel pipes through one of the first ends or the second ends of the plurality of bending steel pipes, and a high frequency vibration part on which the support pallet is seated and which performs high frequency vibrations to shot-peen the inner portions of the plurality of bending steel pipes supported by the support pallet.

3 Claims, 6 Drawing Sheets

| Experimental Example | | Vibration (Hz) | Time (sec) | Thickness (μm) of Oxide Layer | Measurement Result | Remark |
|---|---|---|---|---|---|---|
| Before | | X | X | 35~40 | | Oxide Layer Is Thick |
| After | 1 | 300 | 60 | 27~32 | | Descaling Effect Is Insufficient |
| | 2 | 300 | 120 | | | |
| | 3 | 300 | 180 | 16~20 | | |
| | 4 | 300 | 240 | | | |
| | 5 | 500 | 120 | 9~11 | | |
| | 6 | 500 | 180 | 3~5 | | Good Condition of 5 μm or less |
| | 7 | 500 | 240 | | | |
| | 8 | 1000 | 180 | 1~2 | | |
| | 9 | 1000 | 240 | 1 or less | | |

APPARATUS FOR DESCALING INNER SURFACE OF BENDING STEEL PIPE

CROSS REFERENCE TO RELATED APPLICATION

This application claims priority to and the benefit of Korean Patent Application No. 10-2021-0079076 filed in the Korean Intellectual Property Office on Jun. 18, 2021, the entire contents of which are incorporated herein by reference.

BACKGROUND

(a) Field

The present disclosure relates to an apparatus for descaling an inner surface of a bending steel pipe.

(b) Description of the Related Art

In general, heat treatment is performed only on a component requiring an ultra-high strength among vehicle components, but in a case of a component on which surface treatment such as plating is not performed, it is essential to additionally descale a surface of the component. Through such a process, compressive residual stress is formed on the surface of the component, such that an appearance quality of the component is secured and a fatigue durability strength is improved.

As a conventional method for descaling the surface of a component, there is a shot peening method for applying physical peening to the surface of the component using a shot ball.

Recently, a heat-treated bending steel pipe has been used as a back frame of a vehicle seat, but a scale formed on an inner surface of the bending steel pipe during heat treatment is separated from the bending steel pipe to pollute the vehicle seat or cause noise.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide an apparatus for descaling an inner surface of a bending steel pipe having advantages of effectively descaling the inner surface of the bending steel pipe used as a back frame of a vehicle seat and heat-treated.

An exemplary embodiment of the present disclosure provides an apparatus for descaling an inner surface of a bending steel pipe, including a support pallet supporting a plurality of bending steel pipes of which first ends and second ends are opened, the plurality of bending steel pipes being disposed in one direction on the support pallet, a stopper part selectively stopping the first ends and the second ends of the plurality of bending steel pipes, a shot ball supply part supplying shot balls to inner portions of the plurality of bending steel pipes through one of the first ends or second ends of the plurality of bending steel pipes, and a high frequency vibration part on which the support pallet is seated and which performs high frequency vibrations to shot-peen the inner portions of the plurality of bending steel pipes supported by the support pallet.

The plurality of bending steel pipes may be in a heat-treated state and have a U-shape.

Each of the plurality of bending steel pipes may be a back frame of a vehicle seat.

The support pallet may include first guide pins supporting the first ends of the plurality of bending steel pipes, and second guide pins supporting the second ends of the plurality of bending steel pipes.

The support pallet may further include first clamps clamping the first ends of the plurality of bending steel pipes to the first guide pins, and second clamps clamping the second ends of the plurality of bending steel pipes to the second guide pins.

The stopper part may include first stoppers stopping the first ends of the plurality of bending steel pipes, and second stoppers stopping the second ends of the plurality of bending steel pipes.

The shot ball supply part may supply the shot balls to the inner portions of the plurality of bending steel pipes through the second ends of the plurality of bending steel pipes after the first ends of the plurality of bending steel pipes are stopped by the first stoppers.

The high frequency vibration part may shot-peen the inner portions of the plurality of bending steel pipes supported by the support pallet by vibrating the support pallet seated thereon at a high frequency after the second ends of the plurality of bending steel pipes are stopped by the plurality of second stoppers.

The high frequency vibration part may perform high frequency vibrations for 180 seconds to 240 seconds as vibrations at 500 Hz to 1000 Hz.

According to an exemplary embodiment, an apparatus for descaling an inner surface of a bending steel pipe capable of effectively descaling the inner surface of the bending steel pipe used as a back frame of a vehicle seat and heat-treated is provided.

BRIEF DESCRIPTION OF THE FIGURES

FIG. 2 is a view illustrating an example of a method for manufacturing a bending steel pipe.

FIG. 6 is a table illustrating Experimental Examples using the apparatus for descaling an inner surface of a bending steel pipe according to an exemplary embodiment.

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In addition, unless explicitly described to the contrary, the word "comprise", and variations such as "comprises" or "comprising", will be understood to imply the inclusion of stated elements but not the exclusion of any other elements.

Hereinafter, an apparatus for descaling an inner surface of a bending steel pipe according to an exemplary embodiment will be described with reference to FIGS. 1 to 6.

Figure 1:
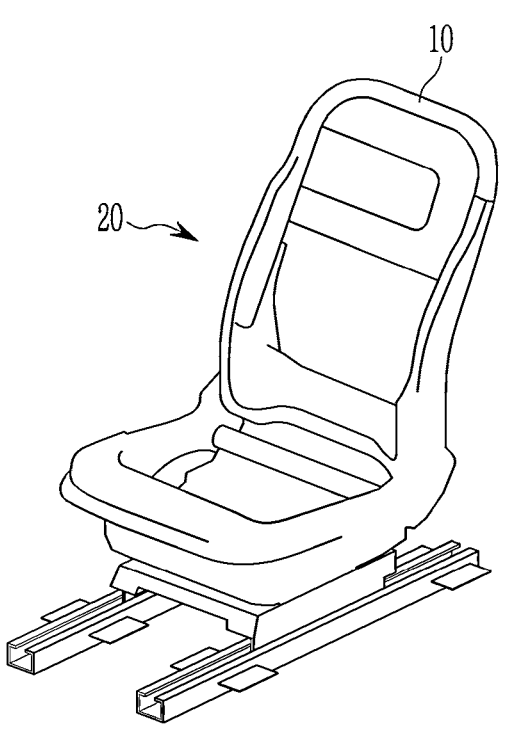
FIG. 1 is a view illustrating a bending steel pipe used as a back frame of a vehicle seat.

FIG. 1 is a view illustrating a bending steel pipe used as a back frame of a vehicle seat.

Referring to FIG. 1, a bending steel pipe 10, which is a back frame of a vehicle seat 20 used in the interior of a vehicle, is a component requiring an ultra-high strength among vehicle components, and is a component on which additional heat treatment is performed for this purpose.

Figure 2:
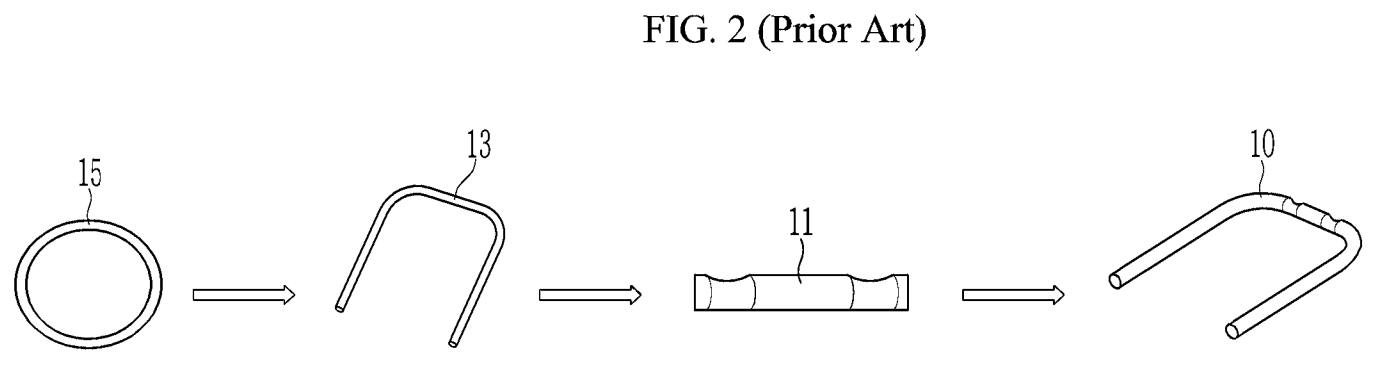

FIG. 2 is a view illustrating an example of a method for manufacturing a bending steel pipe.

Referring to FIG. 2, as an example of a method for manufacturing the bending steel pipe 10, the bending steel pipe 10 may be manufactured by performing cold-bending 13 on a raw material steel pipe 15, performing forming and pressing 11 of a partial form, and heat-treating the bending steel pipe 10, but is not limited thereto. Here, the heat treatment of the bending steel pipe 10 may be performed by heating the bending steel pipe 10 to 900° C. to 1000° C. for 1 minute to 10 minutes and then quenching the bending steel pipe 10 by water cooling or air cooling, but is not limited thereto.

Scales are formed on an outer surface and an inner surface of the bending steel pipe 10 due to the heat treatment and the quenching, and the scale formed on the outer surface of the bending steel pipe 10 may be removed using various known shot peening apparatuses.

Figure 3:
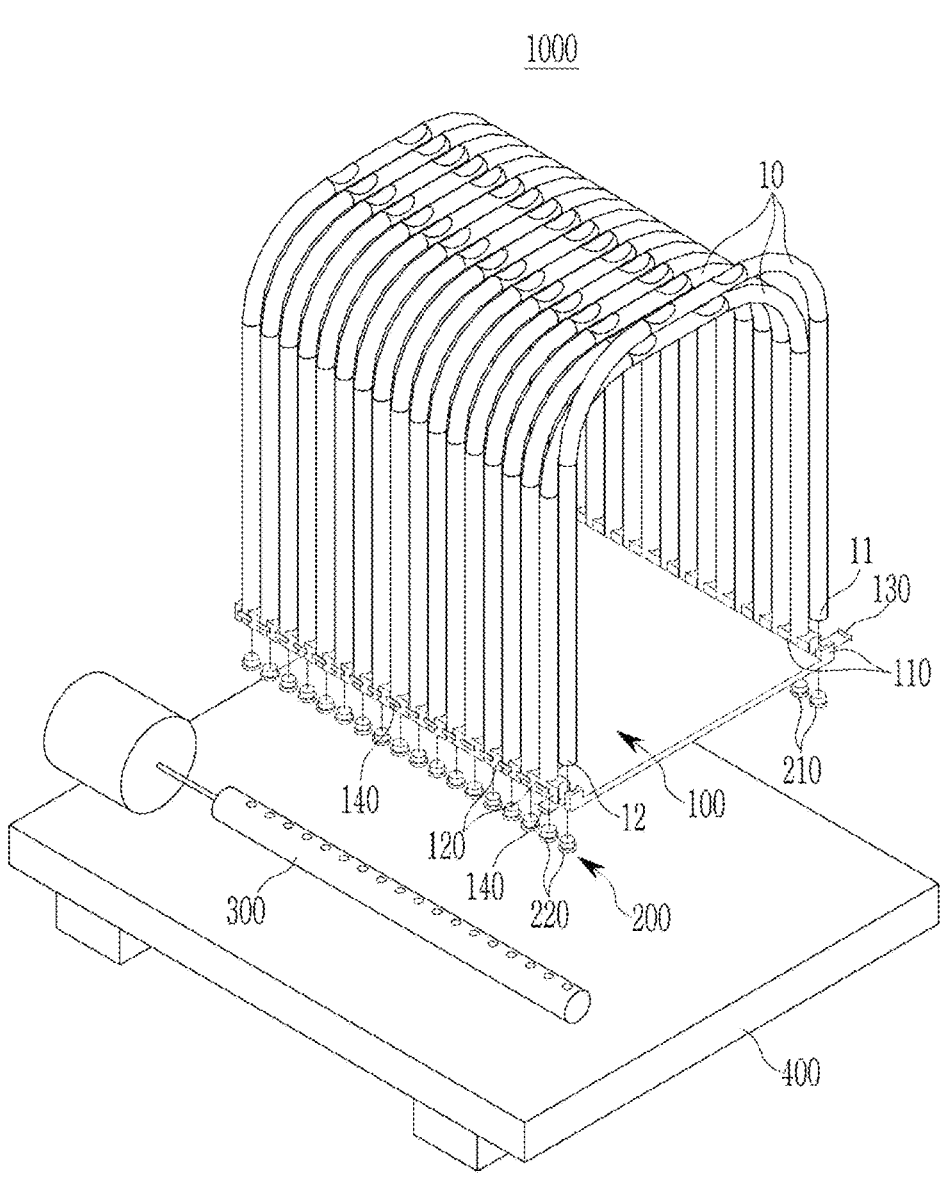
FIG. 3 is a view illustrating an apparatus for descaling an inner surface of a bending steel pipe according to an exemplary embodiment.

FIG. 3 is a view illustrating an apparatus for descaling an inner surface of a bending steel pipe according to an exemplary embodiment.

Referring to FIG. 3, an apparatus 1000 for descaling an inner surface of a bending steel pipe according to an exemplary embodiment is an apparatus for removing the scale formed on the inner surface of the bending steel pipe 10, which is the back frame of the vehicle seat, but is not limited thereto, and may remove a scale formed on an inner surface of a curved bending steel pipe 10 used as various components.

The apparatus 1000 for descaling an inner surface of a bending steel pipe according to an exemplary embodiment is an apparatus for removing scales by simultaneously shot-peening inner surfaces of a plurality of bending steel pipes 10 of which one ends 11 and the other ends 12 are opened, and includes a support pallet 100, a stopper part 200, a shot ball supply part 300, and a high frequency vibration part 400.

The support pallet 100 supports the plurality of bending steel pipes 10 of which first ends 11 and second ends 12 are opened, the plurality of bending steel pipes 10 being disposed in one direction on the support pallet 100. Here, the plurality of bending steel pipes 10 may be in a heat-treated state and may have a U-shape, but is not limited thereto and may extend in various shapes such as a straight line shape, a curved line shape, a closed loop shape, and an open loop shape. In addition, each of the plurality of bending steel pipes 10 may be a back frame of a vehicle seat, but is not limited thereto. The support pallet 100 has a rectangular shape in plan view, but is not limited thereto, and may have various shapes in plan view such as a triangular shape, a circular shape, an elliptical shape, a pentagonal shape, and a polygonal shape.

The support pallet 100 includes first guide pins 110, second guide pins 120, first clamps 130, and second clamps 140.

There are a plurality of first guide pins 110, and the plurality of first guide pins 110 extend in one direction and are positioned at one edge of the support pallet 100. The plurality of first guide pins 110 support first ends 11 of the plurality of bending steel pipes 10. The plurality of first guide pins 110 have a circularly depressed shape according to a shape of first ends 11 of the plurality of bending steel pipes 10, but are not limited thereto, and may have various depressed shapes such as a rectangular shape, a triangular shape, a polygonal shape, an elliptical shape, or a bar shape capable of supporting first ends 11 of the plurality of bending steel pipes 10.

There are a plurality of second guide pins 120, and the plurality of second guide pins 120 extend in one direction in a state in which they are spaced apart from the plurality of first guide pins 110 and are positioned on the other edge of the support pallet 100. The plurality of second guide pins 120 support the second ends 12 of the plurality of bending steel pipes 10. The plurality of second guide pins 120 have a circularly depressed shape according to a shape of the second ends 12 of the plurality of bending steel pipes 10, but are not limited thereto, and may have various depressed shapes such as a rectangular shape, a triangular shape, a polygonal shape, an elliptical shape, or a bar shape capable of supporting the second ends 12 of the plurality of bending steel pipes 10.

There are a plurality of first clamps 130, and the plurality of first clamps 130 are coupled to the plurality of first guide pins 110 to clamp first ends 11 of the plurality of bending steel pipes 10 to the plurality of first guide pins 110. The plurality of first clamps 130 may have various known clamp shapes capable of clamping first ends 11 of the plurality of bending steel pipes 10 to the plurality of first guide pins 110.

There are a plurality of second clamps 140, and the plurality of second clamps 140 are coupled to the plurality of second guide pins 120 to clamp the second ends 12 of the plurality of bending steel pipes 10 to the plurality of second guide pins 120. The plurality of second clamps 140 may have various known clamp shapes capable of clamping the second ends 12 of the plurality of bending steel pipes 10 to the plurality of second guide pins 120.

The stopper part 200 selectively stops the first ends 11 and the second ends 12 of the plurality of bending steel pipes 10 fixed to the support pallet 100. The stopper part 200 may have an outer diameter corresponding to an outer diameter of the plurality of bending steel pipes 10, but is not limited thereto. The stopper part 200 includes a plurality of first stoppers 210 stopping first ends 11 of the plurality of bending steel pipes 10 and a plurality of second stoppers 220 stopping the second ends 12 of the plurality of bending steel pipes 10.

The shot ball supply part 300 neighbors to the support pallet 100, and supplies shot balls to inner portions of the plurality of bending steel pipes 10 through one of the first ends 11 or the second ends 12 of the plurality of bending steel pipes 10 fixed to the support pallet 100.

Figure 4:
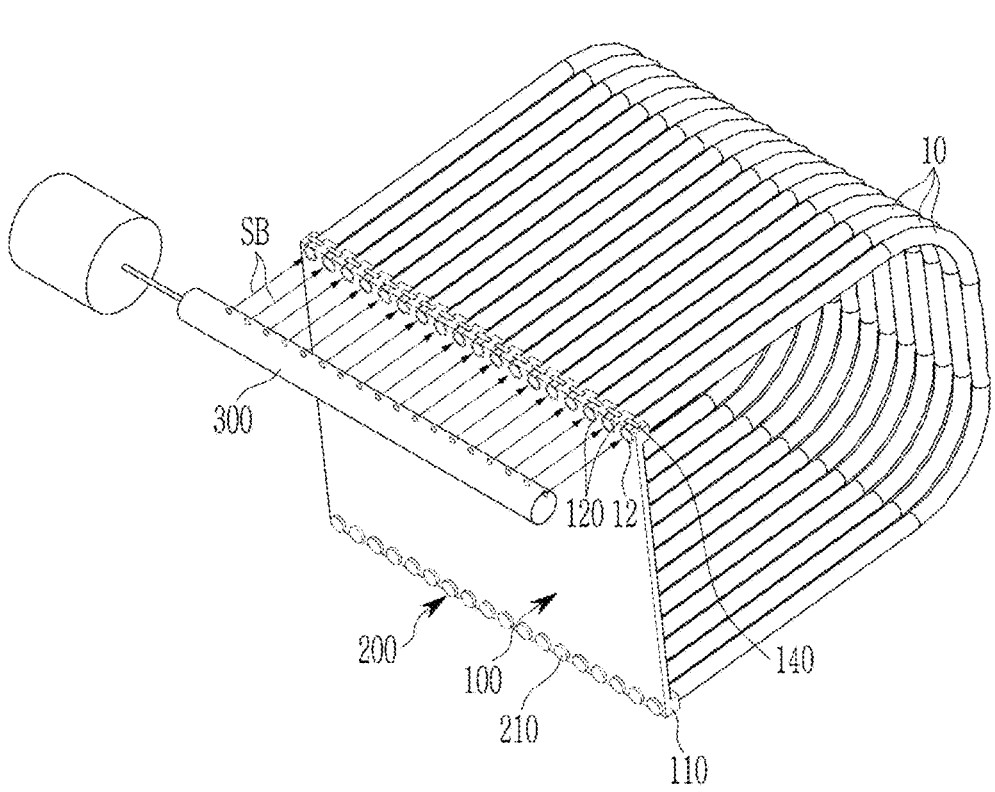
FIG. 4 is a view illustrating that shot balls are supplied to inner portions of a plurality of bending steel pipes fixed to a support pallet of the apparatus for descaling an inner surface of a bending steel pipe according to an exemplary embodiment using a shot ball supply part.

FIG. 4 is a view illustrating that shot balls are supplied to inner portions of a plurality of bending steel pipes fixed to a support pallet of the apparatus for descaling an inner surface of a bending steel pipe according to an exemplary embodiment using a shot ball supply part.

Referring to FIG. 4, the shot ball supply part 300 may supply shot balls SB to the inner portions of the plurality of bending steel pipes 10 together with compressed air through the second ends 12 of the plurality of bending steel pipes 10 after the first ends 11 of the plurality of bending steel pipes 10 are stopped by the plurality of first stoppers 210, in a state in which the support pallet 100 to which the plurality of bending steel pipes 10 are fixed is rotated by 90° using a moving means such as a robot arm. The shot ball supply part 300 may induce quantitative and uniform stacking of the shot balls SB inside the plurality of bending steel pipes 10 using the compressed air.

Meanwhile, in another exemplary embodiment, the shot ball supply part 300 may supply shot balls SB to the inner portions of the plurality of bending steel pipes 10 together with compressed air through the second ends 12 of the plurality of bending steel pipes 10 after the first ends 11 of the plurality of bending steel pipes 10 are stopped by the plurality of first stoppers 210, in a state in which the support pallet 100 is rotated by 180° or in a state in which the support pallet 100 is not rotated.

After the shot balls SB are supplied to the inner portions of the plurality of bending steel pipes 10 through the second ends 12 of the plurality of bending steel pipes 10, the second ends 12 of the plurality of bending steel pipes 10 may be stopped by the plurality of second stoppers 220.

Figure 5:
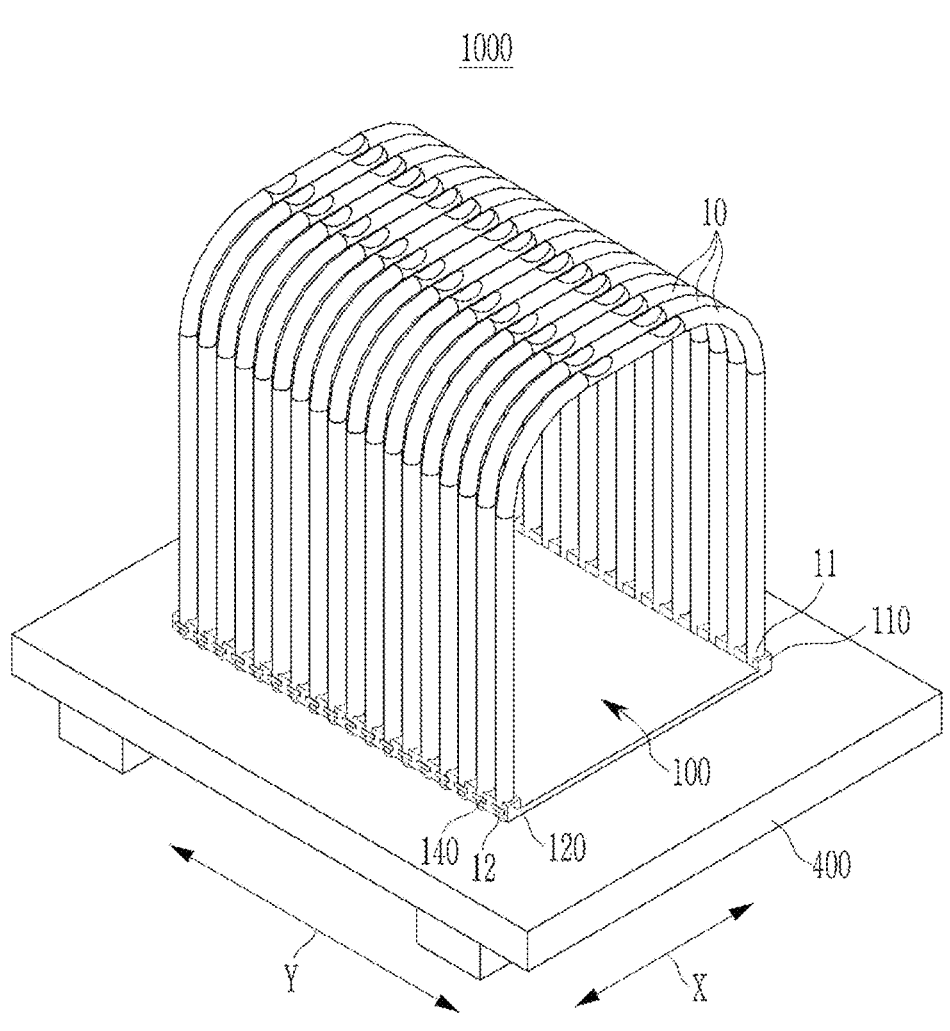
FIG. 5 is a view illustrating shot-peening the inner portions of the plurality of bending steel pipes fixed to the support pallet seated on a high frequency vibration part of the apparatus for descaling an inner surface of a bending steel pipe according to an exemplary embodiment.

FIG. 5 is a view illustrating shot-peening the inner portions of the plurality of bending steel pipes fixed to the support pallet seated on a high frequency vibration part of the apparatus for descaling an inner surface of a bending steel pipe according to an exemplary embodiment.

Referring to FIGS. 5 and 3, the support pallet 100 to which the plurality of bending steel pipes 10 are fixed is seated on the high frequency vibration part 400 using a moving means such as a robot arm. The high frequency vibration part 400 performs high frequency vibrations to shot-peen the inner portions of the plurality of bending steel pipes 10 fixed to the support pallet 100, thereby removing scales formed on inner surfaces of the plurality of bending steel pipes 10. Here, the shot peening may include shot blast.

The high frequency vibration part 400 shot-peens the inner portions of the plurality of bending steel pipes 10 fixed to the support pallet 100 by vibrating the support pallet 100 seated thereon at a high frequency after the second ends 12 of the plurality of bending steel pipes 10 are stopped by the plurality of second stoppers 220, such that the shot balls are sealed inside the plurality of bending steel pipes 10.

The high frequency vibration part 400 may simultaneously perform leftward and rightward vibrations X, forward and backward vibrations Y, clockwise tilting, counterclockwise tilting, clockwise rotation, counterclockwise rotation, and the like, together with high frequency vibrations, but is not limited thereto. The high frequency vibration part 400 may include various known high frequency vibration generators for the high frequency vibrations and various known actuators the leftward and rightward vibrations X, the forward and backward vibrations Y, the clockwise tilting, the counterclockwise tilting, the clockwise rotation, the counterclockwise rotation, and the like, but is not limited thereto.

After the inner portions of the plurality of bending steel pipes 10 fixed to the support pallet 100 by the high frequency vibrations of the high frequency vibration part 400 is shot-peened, the plurality of first stoppers 210 or the plurality of second stoppers 220 may be removed from the plurality of bending steel pipes 10, the shot balls supplied to the inner portions of the plurality of bending steel pipes 10 may be discharged, and then, the plurality of bending steel pipes 10 may be separated from the support pallet 100 and transferred to a subsequent process such as a painting process.

The high frequency vibration part 400 performs high frequency vibrations for 180 seconds to 240 seconds as vibrations at 500 Hz to 1000 Hz. Here, the high frequency vibrations for 180 seconds to 240 seconds as the vibrations at 500 Hz to 1000 Hz performed by the high frequency vibration part 400 are in a threshold range, which was confirmed through Experimental Examples to be described later.

FIG. 6 is a table illustrating Experimental Examples using the apparatus for descaling an inner surface of a bending steel pipe according to an exemplary embodiment.

Referring to FIG. 6, Experimental Examples 1 to 9 were performed with various vibrations and for various times using the apparatus for descaling an inner surface of a bending steel pipe according to an exemplary embodiment.

Before an experiment, a thickness of an oxide layer, which is a scale on an inner surface of a bending steel pipe that is heat-treated, was 35 μm to 40 μm.

According to Experimental Examples 1 to 4, as a result of high frequency vibrations of the high frequency vibration part for 60 to 240 seconds as vibrations at 300 Hz, the thickness of the oxide layer, which is the scale on the inner surface of the bending steel pipe, was reduced to 16 μm to 32 μm, such that a descaling effect was insufficient.

According to Experimental Example 5, as a result of high frequency vibrations of the high frequency vibration part for 120 seconds as vibrations at 500 Hz, the thickness of the oxide layer, which is the scale on the inner surface of the bending steel pipe, was reduced to 9 μm to 11 μm, such that a descaling effect was insufficient.

According to Experimental Examples 6 to 9, as a result of high frequency vibrations of the high frequency vibration part for 180 to 240 seconds as vibrations at 500 Hz to 1000 Hz, the thickness of the oxide layer, which is the scale on the inner surface of the bending steel pipe, was reduced to 1 μm to 5 μm, such that a descaling effect was 5 μm or less, which is good.

As confirmed by the above-described Experimental Examples 1 to 9, when the high frequency vibration part high frequency vibrations for 180 to 240 seconds as vibrations at a frequency less than 500 Hz, an effect of descaling the inner surface of the bending steel pipe is insufficient. In addition, when the high frequency vibration part performs high frequency vibrations for 180 seconds to 240 seconds as vibrations at a frequency exceeding 1000 Hz, the inner surface of the bending steel pipe is removed together with the scale on the inner surface of the bending steel pipe, such that a strength itself of the bending steel pipe is decreased.

As confirmed by the above-described Experimental Examples 1 to 9, the high frequency vibration part efficiently removes the scale formed on the inner surface of the bending steel pipe by performing the high frequency vibrations for 180 to 240 seconds as the vibrations at 500 Hz to 1000 Hz, which is the threshold range.

As described above, the apparatus 1000 for descaling an inner surface of a bending steel pipe according to an exemplary embodiment includes the support pallet 100, the stopper part 200, the shot ball supply part 300, and the high frequency vibration part 400 to effectively descale the inner surfaces of the plurality of bending steel pipes 10 each used as the back frame of the vehicle sheet and heat-treated.

In addition, the apparatus 1000 for descaling an inner surface of a bending steel pipe according to an exemplary embodiment shot-peens the inner surfaces of the plurality of bending steel pipes 10 to impart compressive residual stress through inner surface treatment to the plurality of bending steel pipes 10, thereby improving fatigue resistance or the like of the plurality of bending steel pipes 10.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. An apparatus for descaling an inner surface of a bending steel pipe, comprising:

a support pallet configured to support a plurality of bending steel pipes of which first ends and second ends are opened, the plurality of bending steel pipes being disposed in one direction on the support pallet;

a stopper part configured to stop the first ends and the second ends of the plurality of bending steel pipes;

a shot ball supply part configured to supply shot balls to inner portions of the plurality of bending steel pipes through one of the first ends or the second ends of the plurality of bending steel pipes; and a high frequency vibration part on which the support pallet is seated and which performs high frequency vibrations to shot-peen the inner portions of the plurality of bending steel pipes supported by the support pallet;

wherein the stopper part includes:

a plurality of first stoppers configured to stop the first ends of the plurality of bending steel pipes; and a plurality of second stoppers configured to stop the second ends of the plurality of bending steel pipes;

wherein the shot ball supply part is configured to supply the shot balls to the inner portions of the plurality of bending steel pipes through the second ends of the plurality of bending steel pipes after the first ends of the plurality of bending steel pipes are stopped by the plurality of first stoppers;

wherein the high frequency vibration part shot-peens the inner portions of the plurality of bending steel pipes supported by the support pallet by vibrating the support pallet seated thereon at a high frequency after the second ends of the plurality of bending steel pipes are stopped by the plurality of second stoppers;

wherein the plurality of bending steel pipes are in a heat-treated state and have a U-shape;

wherein first ends and the second ends are supported by the support pallet;

wherein the high frequency vibration part performs high frequency vibrations for 180 seconds to 240 seconds as vibrations at 500 Hz to 1000 Hz;

wherein the support pallet includes:

first guide pins configured to support the first ends of the plurality of bending steel pipes; and second guide pins configured to support the second ends of the plurality of bending steel pipes; and wherein the plurality of first guide pins each have a depressed shape configured to receive the first ends of the plurality of bending steel pipes, and the plurality of second guide pins each have a depressed shape configured to receive the second ends of the plurality of bending steel pipes.

2. The apparatus for descaling an inner surface of a bending steel pipe of claim 1, wherein:

each of the plurality of bending steel pipes forms a back frame of a vehicle seat.

3. The apparatus for descaling an inner surface of a bending steel pipe of claim 1, wherein:

the support pallet further includes:

first clamps configured to clamp the first ends of the plurality of bending steel pipes to the first guide pins; and second clamps configured to clamp the second ends of the plurality of bending steel pipes to the second guide pins.

* * * * *